United States Patent
Alexander et al.

(10) Patent No.: US 10,614,261 B1
(45) Date of Patent: Apr. 7, 2020

(54) HONORING PIN INSERTION DELAY DURING CLOCK TREE SYNTHESIS

(71) Applicant: Cadence Design Systems, Inc., San Jose, CA (US)

(72) Inventors: Michael Alexander, Graham, WA (US); Kwangsoo Han, Austin, TX (US); Zhuo Li, Austin, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 16/268,327

(22) Filed: Feb. 5, 2019

(51) Int. Cl.
*G06F 30/392* (2020.01)
*G06F 111/04* (2020.01)
*G06F 119/12* (2020.01)

(52) U.S. Cl.
CPC ........ *G06F 30/392* (2020.01); *G06F 2111/04* (2020.01); *G06F 2119/12* (2020.01)

(58) Field of Classification Search
CPC . G06F 30/392; G06F 2111/04; G06F 2119/12
See application file for complete search history.

(56) References Cited

U.S. PATENT DOCUMENTS

| 6,782,519 B2 * | 8/2004 | Chang | G06F 1/10 716/114 |
| 2003/0135936 A1 * | 7/2003 | Kleen | A61K 8/673 8/405 |
| 2003/0182634 A1 * | 9/2003 | Chang | G06F 1/10 716/114 |

* cited by examiner

Primary Examiner — Stacy Whitmore
(74) Attorney, Agent, or Firm — Schwegman Lundberg & Woessner, P.A.

(57) ABSTRACT

Aspects of the present disclosure address systems and methods for dynamically adjusting skew windows during clock tree synthesis (CTS). A method may include identifying a pin insertion delay (PID) assigned to a clock sink in a set of clock sinks of a buffer tree in an integrated circuit design. The method further includes determining a skew window for the clock sink based on a skew target and adjusting the skew window based on identifying the PID assigned to the clock sink. The skew window is adjusted based on a skew adjustment parameter. The method further includes building a clock tree based on the buffer tree and the adjusted skew window. The building of the clock tree comprises tuning a clock path delay of the clock sink according to the adjusted skew window. A layout instance may be generated for the IC design based in part on the clock tree.

20 Claims, 6 Drawing Sheets

HONORING PIN INSERTION DELAY DURING CLOCK TREE SYNTHESIS

TECHNICAL FIELD

The present disclosure generally relates to the technical field of integrated circuit design. In particular, the present disclosure addresses systems and methods for honoring pin insertion delay during clock tree synthesis.

BACKGROUND

An integrated circuit (IC) layout specifies portions of various components of an IC. When the IC is to include a large number of registers, latches, flip-flops, and/or other types of clocked devices ("sinks") that are to be clocked by one or more clocks, the IC must include one or more clock trees for delivering the clock signal from the clock source to all of the sinks to be clocked by it. A clock tree distributes a clock signal from its root (e.g., a clock source) to a set of sinks (e.g., flip flops) within an IC through a branching network of drivers (e.g., buffers or inverters). A single driver distributes the clock signal to a grouping of other drivers and/or sinks. Connectivity between a driver and its fanout components (e.g., other drivers and/or sinks) is described by a "clock net" and will be physically implemented by routed wires.

Electronic design automation (EDA) software systems commonly perform clock-tree synthesis (CTS). Conventional approaches to CTS include building a clock tree by placing drivers at various regions of the IC design based on satisfaction of a set of clock tree design constraints that include timing constraints such as clock skew among others (e.g., clock slew and clock latency). Clock skew refers to a difference in clock arrival time between two clock sinks.

In some instances, clock skew may be intentionally added into a clock tree. Clock skew that is intentionally added into a clock tree is referred to as "useful skew." During CTS, a clock path delay for each clock sink is tuned in accordance with design constraints. Prior to tuning clock path delays, a pin insertion delay (PID) may be assigned to a clock path and provided as a constraint to CTS. PID is a virtual delay added to a clock path of the IC design that causes CTS to introduce the useful skew when tuning clock path delays.

Conventionally, a global clock skew target is provided as a clock tree design constraint and a fixed skew window for clock sinks in the clock tree is determined based on the clock skew target during CTS. Clock path delays of clock sinks are tuned during CTS such that the difference in clock arrival time between any two sinks falls within the skew window. For example, given a 100 ps clock skew target, CTS will produce a buffered clock tree in which the difference in clock arrival time between any two clock sinks in the clock tree is between 0ps and 100 ps. To achieve this clock balancing, clock arrival time at some clock sinks may be delayed compared to a reference delay while clock arrival time at some clock sinks may be advanced compared to the reference delay. The skew window determined during CTS defines a permissible clock arrival delay and advance limit relative to a target delay, which is based on the reference delay.

In instances in which PID is assigned to a clock path of a clock sink to introduce useful skew, the target delay for the clock window is based on an offset applied to the reference delay (also referred to as a "skew offset") determined based on the PID. However, if the skew window of clock tree is too large, the PID in the clock path may not be honored because the clock sink may be buffered such that the clock arrival time for the clock sink is within the skew window without accounting for the skew offset applied to the target delay based on the PID. For example, the clock path delay of a clock sink may be tuned such that the clock arrival time for the clock sink is near or at the delay or advance limit of the skew window. As a result, the actual useful skew in the resulting clock tree may be diminished or even negated compared to the intended useful skew.

BRIEF DESCRIPTION OF THE DRAWINGS

Various ones of the appended drawings merely illustrate example embodiments of the present inventive subject matter and cannot be considered as limiting its scope.

DETAILED DESCRIPTION

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

As noted above, traditional electronic design automation (EDA) techniques for clock tree synthesis (CTS) rely upon a fixed global skew window that result in problems with honoring pin insertion delay (PID) added to clock paths of an integrated circuit (IC) design. Aspects of the present disclosure address this problem, among others, with systems and methods for dynamically adjusting skew windows during CTS to improve PID honoring.

Consistent with some embodiments, a skew window for each skewed clock sink may be dynamically adjusted and each clock sink is buffered during CTS according to an adjusted skew window. In some embodiments, a method may include accessing an IC design comprising a clock network that includes one or more buffer tree. Each buffer tree includes a buffer, a set of clock sinks, and paths that connect the buffer to each clock sink. The method may further include identifying a pin insertion delay (PID) assigned to a clock sink in a set of clock sinks of a buffer tree in the IC design. The method further includes determining a skew window for the clock sink based on a global skew target provided as a design constraint included in the IC design. The method further includes adjusting the skew window for the clock sink based on identifying the PID assigned to the clock sink. The skew window is adjusted based on a skew adjustment parameter such as a scale factor or a shift factor. The method further includes building a clock tree based in part on the buffer tree and the adjusted skew window of the clock sink. The building of the clock tree comprises tuning a clock path delay of the clock sink according to the adjusted skew window (e.g., by buffering the clock sink according to the adjusted skew window). In some embodiments, the method further includes generating a layout instance that describes physical layout dimensions of the IC design based in part on the clock tree.

Figure 1:
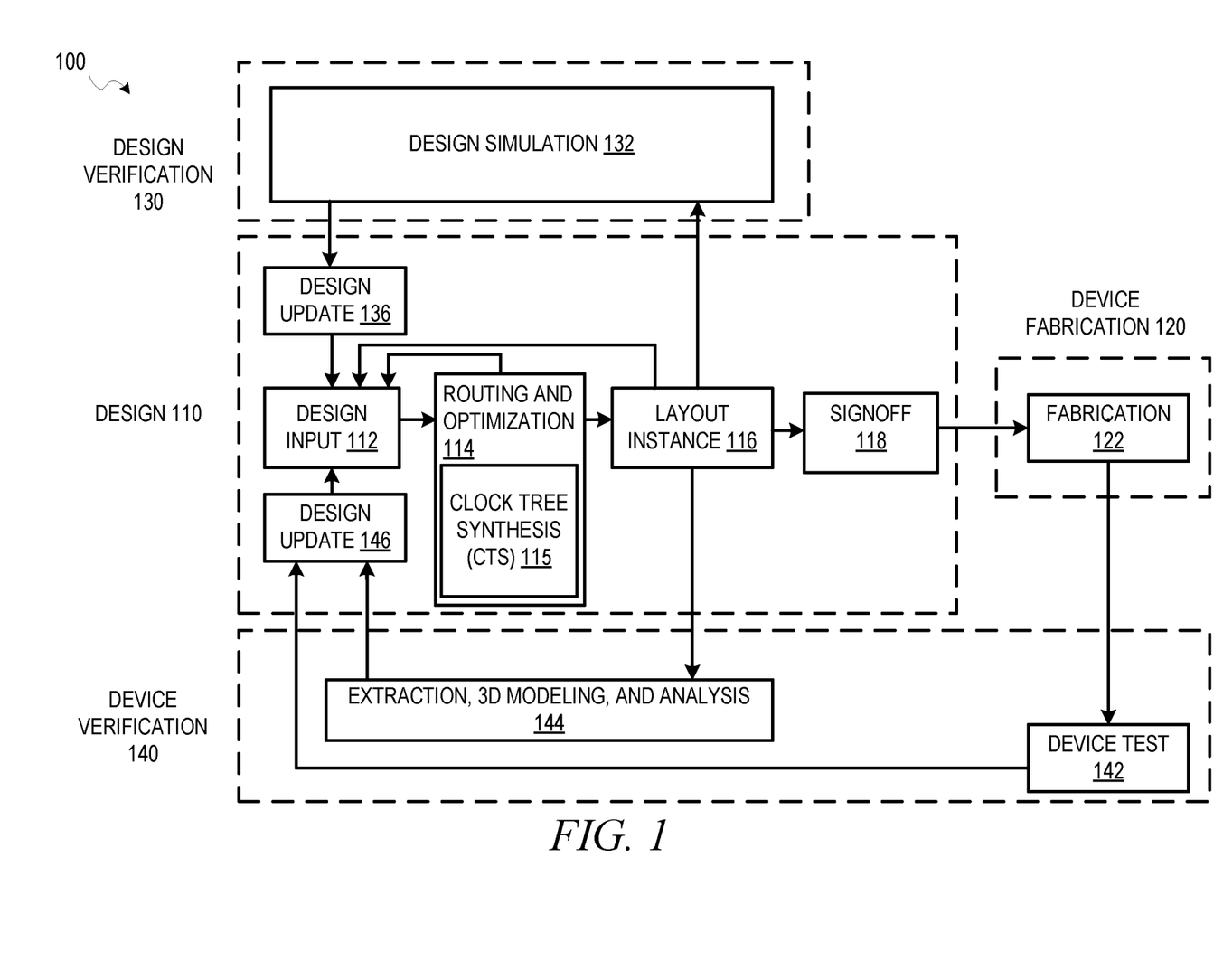
FIG. 1 is a diagram illustrating an example design process flow that includes a clock tree synthesis (CTS) method in which a skew window is dynamically adjusted to honor pin insertion delay (PID), according to some embodiments.

FIG. 1 is a diagram illustrating an example design process flow 100 that includes clock tree wirelength reduction based on target offsets in connected routes, according to some embodiments. As shown, the design process flow 100 includes a design phase 110, a device fabrication phase 120, a design verification phase 130, and a device verification phase 140. The design phase 110 involves an initial design input 112 operation where the basic elements and functionality of a device are determined, as well as revisions based on various analyses and optimization of a circuit design. This design input 112 operation is where block instances are used in the circuit design and any additional circuitry for the design around the blocks is selected. The initial strategy, tactics, and context for the device to be created are also generated in the design input 112 operation, depending on the particular design algorithm to be used.

In some embodiments, following an initial selection of design values in the design input 112 operation, routing, timing analysis, and optimization are performed in a routing and optimization 114 operation, along with any other automated design processes. While the design process flow 100 shows the routing and optimization 114 operation occurring prior to a layout instance 116, routing, timing analysis, and optimization may be performed at any time to verify operation of a circuit design. For instance, in various embodiments, timing analysis in a circuit design may be performed prior to routing of connections in the circuit design, after routing, during register transfer level (RTL) operations, or as part of a signoff 118, as described below.

As shown, the routing and optimization 114 operation includes a clock tree synthesis (CTS) 115 process, which may be performed in accordance with various embodiments described herein. The CTS 115 process generates a clock tree that delivers a clock signal from a clock tree root, which comprises a clock source of a circuit design, to a plurality of clock tree leaf nodes, which comprise a plurality of clock tree sinks within the circuit design. In generating the clock tree, The CTS 115 process instantiates clock circuitry or builds one or more clock buffer trees according to a clock tree specification file, generates a clock tree topology, and balances clock delay in the clock tree. Each buffer tree comprises a clock buffer, a set of clock sinks, and paths connecting the clock buffer to each clock sink in the set of clock sinks.

According to various embodiments, the balancing of the clock delay of the clock tree performed as part of the CTS 115 process may include placing clock buffers on paths of a buffer tree (also referred to as "clock buffering" or simply as "buffering") based on satisfaction of a set of clock tree design constraints, which can include timing constraints such as a global skew target for the generated clock tree among others (e.g., clock slew and latency). The global skew target specifies a maximum skew between any two clock sinks in a clock tree. In buffering the clock tree, CTS 115 buffers clock sinks such that the clock arrival time at the clock sinks is in accordance with a skew window determined based on the global skew target. The skew window specifies an advance limit and delay limit relative to a target delay. In addition to clock buffering, the balancing of the clock delay of the clock tree may include any one or more of: resizing a clock tree instance (e.g., a buffer, inverter, clock gate, or clock logic), moving a clock tree instance to a different location, cloning a clock tree instance instance and partitioning the fanout between the clone, merging two clock tree instances together, and modifying clock net routing to change the delay to the fanout of the net.

As noted above, a virtual delay referred to as PID may be pre-assigned to one or more clock sinks in a clock tree to apply useful skew to the one or more clock sinks in a clock tree. For example, a useful skew may be applied to a clock sink because of a particularly critical timing path of the clock sink. PIDs assigned to clock sinks are provided as an input to CTS 115 (e.g., as part of the clock tree specification file). Clock sinks in which useful skew is applied are referred to as "skewed sinks" and clock sinks in which useful skew is not applied are referred to as "unskewed sinks." The target delay for unskewed comprises a reference delay. The target delay for skewed sinks comprises the reference delay with an added skew offset based on a PID associated with the clock sink.

For an unskewed clock sink, CTS 115 may tune the clock path delay (e.g., by placing one or more additional clock buffers in a clock path of the unskewed clock sink) such that the clock arrival time of the clock sink is within the skew window initially determined based on the global skew target. However, as noted above, the large size of these initial skew windows may cause problems with honoring the PID for skewed clock sinks. To address this issue, initial skew windows of skewed clock sinks are adjusted prior to clock path delay tuning to improve PID honoring. Skew windows for skewed clock sinks are adjusted based on one or more skew adjustment parameters, which may also be provided as an input to CTS 115 (e.g., as part of the clock tree specification file). The skew adjustment parameters may include a scale factor or a shift factor. Accordingly, in adjusting a skew window, the CTS 115 process may apply one or more of the scale factor and shift factor to the skew window. For example, CTS 115 may reduce the skew window by the scale factor or may shift the target delay of the skew window by the shift factor, or a combination of both.

After design inputs are used in the design input 112 operation to generate a circuit layout, and any of the routing and optimization 114 operations are performed, a layout is generated in the layout instance 116. The layout describes the physical layout dimensions of the device that match the design inputs. Prior to this layout being provided to a fabrication 122 operation, the signoff 118 is performed on the circuit design defined by the layout.

After signoff verification by the signoff 118, a verified version of the layout is used in the fabrication 122 operation to generate a device, or additional testing and design updates may be performed using designer inputs or automated updates based on design simulation 132 operations or extraction, 3D modeling, and analysis 144 operations. Once the device is generated, the device can be tested as part of device test 142 operations, and layout modifications generated based on actual device performance.

A design update 136 from the design simulation 132 operations; a design update 146 from the device test 142 operations or the extraction, 3D modeling, and analysis 144 operations; or the design input 112 operation may occur after the initial layout instance 116 is generated. In various embodiments, whenever design inputs are used to update or change an aspect of a circuit design, a timing analysis and the routing and optimization 114 operation may be performed.

Figure 2:
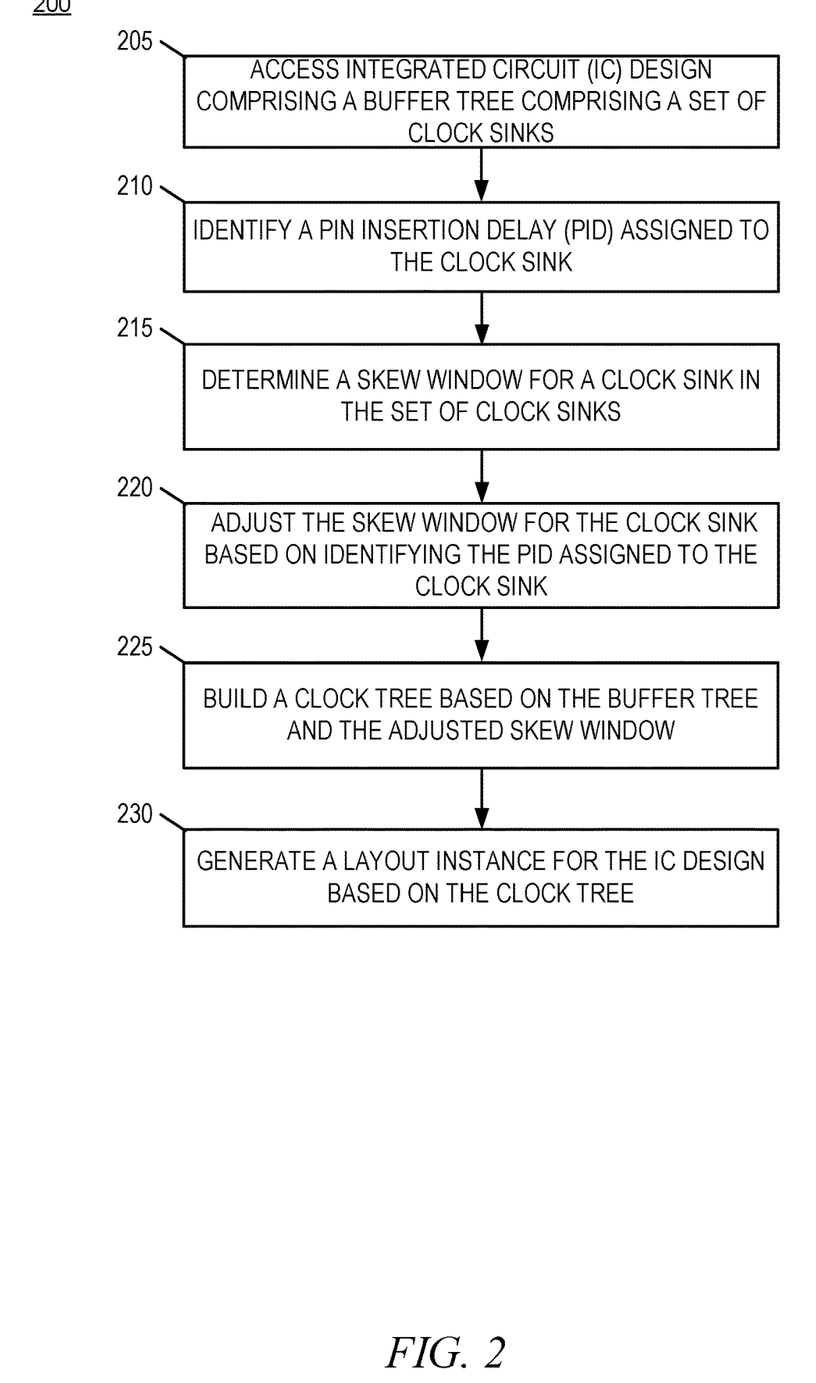
FIG. 2 is a flowchart illustrating operations of a method for CTS in which a skew window is dynamically adjusted to honor PID, according to some example embodiments.

FIG. 2 is a flowchart illustrating operations of a method 200 for CTS 115 in which a skew window is dynamically adjusted to honor PID, according to some example embodiments. It will be understood that the method 200 may be performed by a device, such as a computing device executing instructions of an EDA software system. For instance, the operations of the method 200 may be represented by executable instructions (e.g., EDA software) that, when executed by a processor of a computing device, cause the computing device to perform the method 200. Thus, an operation of the method 200 may be performed by a hardware processor (e.g., central processing unit or graphics processing unit) of a computing device (e.g., desktop, server, etc.). Accordingly, the method 200 is described below with reference to such a computing device.

The method 200, as illustrated, begins at operation 205 where the computing device accesses an IC design stored in memory. The IC design comprises a clock network. The clock network comprises one or more buffer trees. Each buffer tree comprises a buffer and a set of clock sinks connected to the buffer. The IC design also comprises clock tree design constraints including a global skew target. The global skew target specifies a maximum skew between any two clock sinks in a clock tree of the IC design. For example, the IC design may include a global skew target of 100 ps, which constrains the skew between any two clock sinks in the clock tree to 100 ps or less.

At operation 210, the computing device identifies a PID assigned to a clock sink in a buffer tree of the IC design. As noted above, a PID is a virtual delay that is pre-assigned to the clock sink to apply useful skew. Useful skew may be applied between the clock sink and at least one other clock sink in the clock tree based on one or more constraints included in the IC design and the computing device may determine the PID to assign to the clock sink (e.g., prior to the initiation of the method 200) based on the useful skew.

At operation 215, the computing device determines a skew window for a clock sink in the set of clock sinks based on the global skew target and the PID assigned to the clock sink. The skew window comprises an advance limit and a delay limit. The advance and delay limit are relative to a target insertion delay. Accordingly, in determining the skew window for the clock sink, the computing device may determine the target insertion delay for the clock sink. For unskewed sinks, the target insertion delay may be based on a reference insertion delay, which is a predetermined value (e.g., based on user input, design constraints, or a combination of both). Following the example of a 100 ps global skew target from above, the delay limit of the skew window of an unskewed sink is −50 ps relative to a reference insertion delay, and the advance limit of the skew window is +50 ps relative to the reference insertion delay. In other words, the clock arrival time for the clock sink may be delayed by as much as 50 ps relative to the reference insertion delay or may be advanced by as much as 50 ps relative to the reference insertion delay.

For skewed clock sinks such as the clock sink identified at operation 210, the target insertion delay corresponds to the reference insertion delay with an offset based on the PID (also referred to as a "skew offset"). Hence, in determining the skew window for the clock sink identified at operation 210, the computing device determines a skew offset based on the PID and determines the target insertion delay based on the skew offset and the reference insertion delay. Following the example of the 100 ps global skew target and assuming a PID of 20 ps, the target insertion delay is based on a 20 ps offset to a reference insertion delay. Hence, in this example, the delay limit of the skew window of the skewed clock sink is −50 ps relative to the 20 ps target insertion delay, and the advance limit of the skew window is +50 ps relative to the 20 ps target insertion delay.

Based on the PID being assigned to the clock sink, the computing device adjusts the skew window for the clock sink at operation 220 based on a skew window adjustment parameter. The skew window adjustment parameter may be a user provided parameter (e.g., input by the user via a user interface of the EDA software system) or a design parameter included in the IC design. The skew window adjustment parameter may include one or more of a scale factor and a shift factor. Accordingly, the adjusting of the skew window may include applying a scale factor to the skew window (e.g., scaling the skew window by the scale factor), applying a shift factor to the skew window (e.g., shifting the skew window by the shift factor), or a combination of both.

The applying of the scale factor to the skew window may include reducing a size of the skew window. In applying the scale factor to the skew window, the computing device applies the scale factor to both the advance and delay limit of the skew window. Accordingly, the adjusting of the skew window may include reducing the advance and delay limit of the skew window by the scale factor. Following the example from above, given a scale factor of 0.2, the delay limit of the skew window for the clock sink is adjusted to −10 ps relative to the target insertion delay of 20 ps (−50 ps*0.2.=−10 ps), and the advance limit of the skew window for the clock sink is adjusted to +10 ps relative to the target insertion delay of 20 ps (+50 ps*0.2.=+10 ps).

The shifting of the skew window based on the shift factor may include changing the target insertion delay. In shifting the skew window, the computing device may decrease or increase the target insertion delay to further advance or delay the clock arrival time at the clock sink. Following the example of the 100 ps skew target and 20 ps PID and assuming a shift factor of 10 ps, the computing device may adjust the skew window such that the delay limit is −50 ps relative to a target insertion delay of 30 ps (reference insertion delay +20 ps PID+10 ps shift factor=30 ps), and such that the advance limit is +50 ps relative to the target insertion delay of 30 ps.

At operation 225, the computing device builds a clock tree based on the buffer tree and the adjusted skew window of the clock sink. The building of the clock tree includes tuning a clock path delay of the clock sink according to the adjusted skew window. For example, in building the clock tree, the computing device places clock drivers at various regions of the IC design. The computing device may place one or more clock drivers in any one of the clock paths that connect the set of clock sinks to the buffer in accordance with respective skew windows (unadjusted or adjusted) associated with each clock sink as well as other clock tree design constraints. For example, in tuning the clock path delay of the clock sink, the computing device may place one or more buffers in a clock path of the clock sink such that the skew of the clock sink is within the adjusted skew window. In other words, the computing device buffers the clock sink in accordance with the adjusted skew window. At least one buffer may be placed in the clock path to apply useful skew to the clock sink based on the PID assigned to the clock sink. As additional examples, in tuning the clock path delay of the clock sink, the computing device may perform any one of more of the following: resizing one or more clock tree instances, moving one or more clock tree instances, cloning one or more clock tree instances, merging one or more clock tree instances, and modifying clock net routing to change the delay to the fanout of the net."

At operation 230, the computing device generates a layout instance 116 for the IC design based on the clock tree. The layout instance 116 for the IC design describes physical layout dimensions of the IC device design.

Depending on the embodiment, an operation of the method 200 may be repeated in different ways or involve intervening operations not shown. For example, prior to building the clock tree at operation 225, the operations 210, 215, and 220 may be repeated for one or more additional clock sinks in the buffer tree or in one or more other buffer trees in the IC design. In some embodiments, the operations 215 and 220 may be repeated for each skewed sink in the IC design. Though the operations of the method 200 may be depicted and described in a certain order, the order in which the operations are performed may vary among embodiments, including performing certain operations in parallel.

Figure 3A:
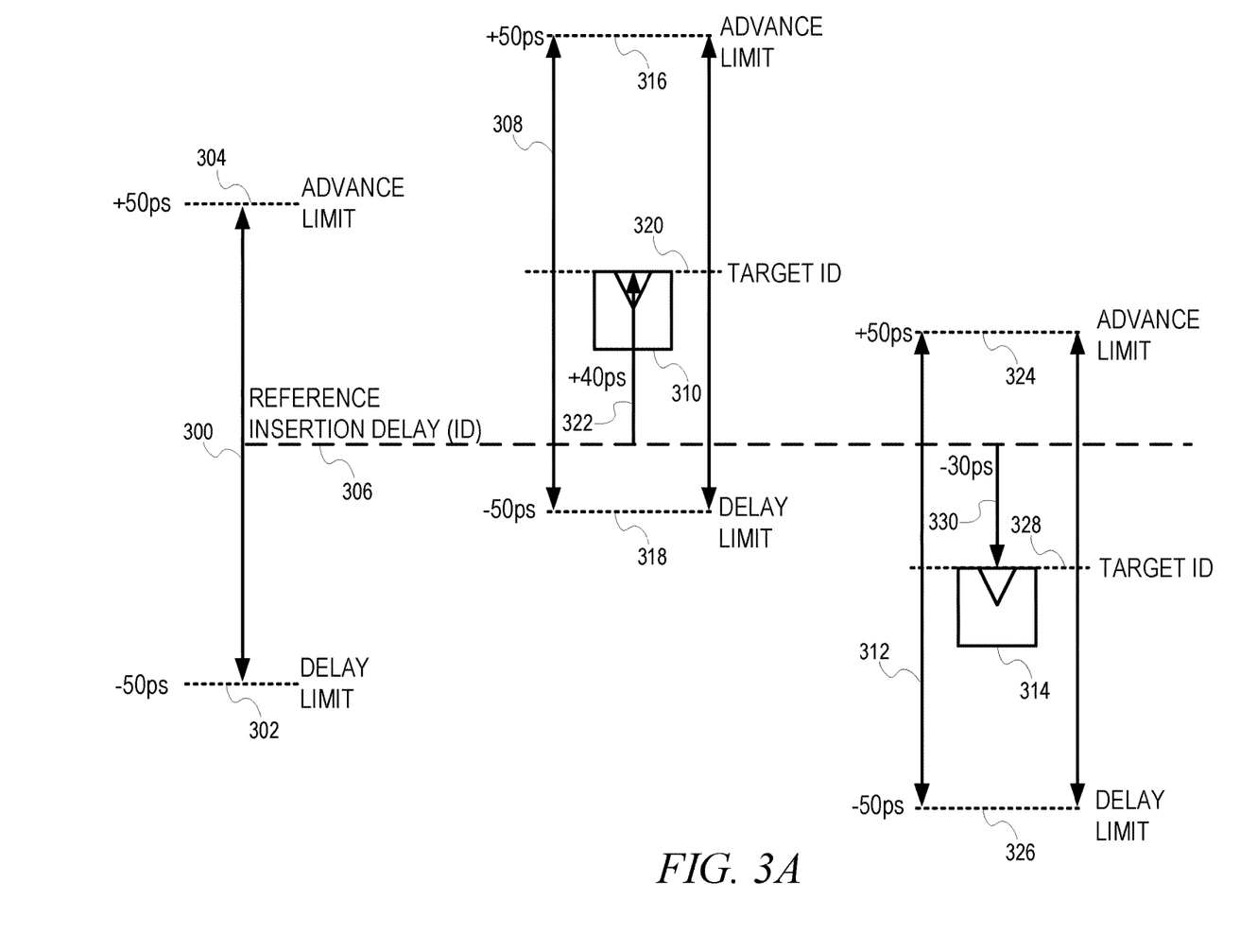
FIGS. 3A and 3B are conceptual diagrams that graphically illustrate an operation of adjusting clock skew windows during CTS, according to some embodiments.
Figure 3B:
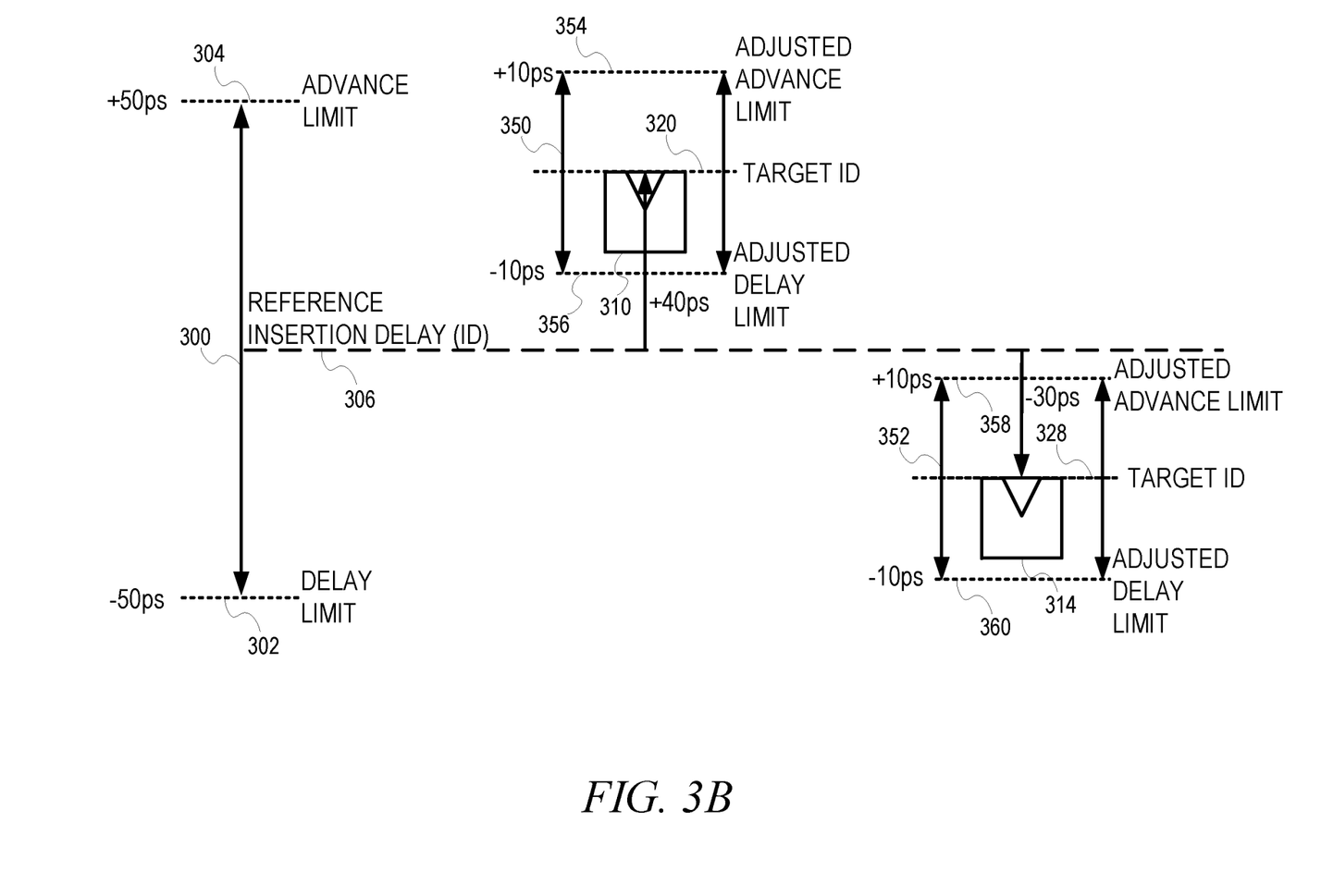

FIGS. 3A and 3B are conceptual diagrams that graphically illustrate an operation of adjusting clock skew windows during CTS 115, according to some embodiments. With reference to FIG. 3A, a global skew window 300 for a clock tree of an IC design is illustrated. The global skew window 300 corresponds to unskewed clock sinks in the IC design. The global skew window 300 is based on a global skew target of 100 ps. As shown, the global skew window 300 includes a delay limit 302 (−50 ps) and an advance limit 304 (+50 ps). The delay limit 302 and the advance limit 304 of the global skew window 300 are relative to a predetermined reference insertion delay 306.

FIGS. 3A also illustrates a skew window 308 of a clock sink in the example form of a flip flop 310 and a skew window 312 of a clock sink in the example for of a flip flop 314. Both the flip flops 310 and 314 have an associated PID and thus both flip flops 310 and 314 may be referred to as "skewed sinks" or "skewed flops." The skew windows 308 and 312 are based on the global skew target of 100 ps and PIDs associated with the flip flops 310 and 314. The skew windows 308 and 312 are examples of the skew windows determined at operation 215 of the method 200.

As shown, the skew window 308 of the flip flop 310 comprises an advance limit 316 and a delay limit 318 relative to a target insertion delay 320. The target insertion delay 320 of the skew window 308 is based on the reference insertion delay 306 with an offset 322 based on a PID associated with the flip flop 310. In this example, the offset 322 is based on a +40 ps PID (a 40 ps advance). Hence, the advance limit 316 of +50 ps is relative to a 40 ps advance relative to the reference insertion delay 306 and the delay limit 318 of −50 ps is relative the 40 ps advance relative to the reference insertion delay 306.

The skew window 312 of the flip flop 314 comprises an advance limit 324 and a delay limit 326 relative to a target insertion delay 328. The target insertion delay 328 of the skew window 312 is based on the reference insertion delay 306 with an offset 330 based on a PID associated with the flip flop 314. In this example, the offset 330 is based on a −30 ps PID (a 30 ps delay). Hence, the advance limit 324 of +50 ps is relative to a 30 ps delay relative to the reference insertion delay 306 and the delay limit 326 of −50 ps is relative the 30 ps delay relative to the reference insertion delay 306.

With reference to FIG. 3B, an adjusted skew window for each of the flip flops 310 and 314 is shown. In particular, FIG. 3B illustrates an adjusted skew window 350 for the flip flop 310 based on the skew window 308 and an adjusted skew window 312 for the flip flop 314 based on the skew window 312. The adjusted skew windows 350 and 352 are examples of the adjusted skew window generated at operation 220 of the method 200.

In the example illustrated in FIG. 3B, a scale factor of 0.2 is applied to the skew windows 308 and 312 to produce the adjusted skew windows 350 and 352. The scale factor of 0.2 is applied to each of the advance and delay limits of the skew windows 308 and 312. For example, the adjusted skew widow 350 comprises adjusted advance limit 354 and adjusted delay limit 356. The adjusted advance limit 354 is +10 ps relative to the target insertion delay 320 (+50 ps*0.2=+10 ps) and the adjusted delay limit 356 is −10 ps relative to the target insertion delay 320 (−50 ps*0.2=−10 ps). As another example, the adjusted skew widow 352 comprises adjusted advance limit 358 and adjusted delay limit 360. The adjusted advance limit 358 is +10 ps relative to the target insertion delay 328 (+50 ps*0.2=+10 ps) and the adjusted delay limit 360 is −10 ps relative to the target insertion delay 328 (−50 ps*0.2=−10 ps).

Figure 4A:
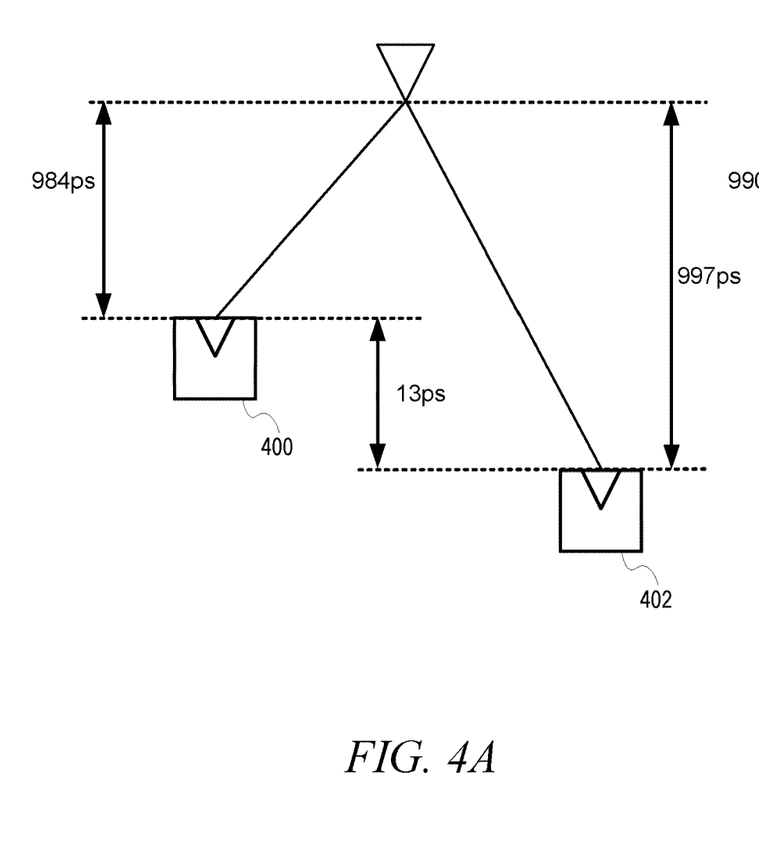
FIG. 4A is conceptual diagram that graphically illustrates example clock sinks buffered according a CTS method in which the skew window for the clock sinks are unadjusted, according to some example embodiments.
Figure 4B:
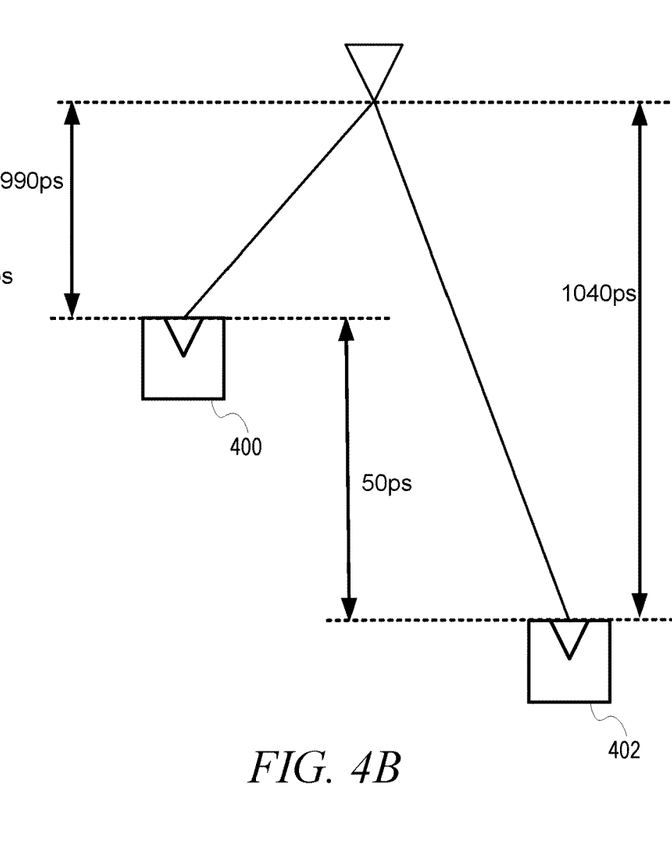
FIG. 4B is a conceptual diagram that graphically illustrates the example clock sinks buffered according to a CTS method in which the skew windows of the clock sinks are dynamically adjusted to honor PID, according to some example embodiments.

Within reference to FIGS. 4A and 4B, examples are illustrated in which skewed flip flops 400 and 402 are buffered. FIG. 4A illustrates an example in which the flip flops 400 and 402 are buffered as part of a CTS method in which skew windows for the flip flops 400 and 402 are unadjusted. That is, skew windows for the flip flops 400 and 402 are determined based on a global skew target and are not adjusted prior to buffering. In contrast, FIG. 4B illustrates an example in which clock path delays of the flop flops 400 and 402 are tuned as part of a CTS method in which skew windows for the flip flops 400 and 402 are dynamically adjusted prior to clock path delay tuning.

In the context of FIGS. 4A and 4B, the flip flop 400 has a +28 ps PID (a 28 ps advance), the flip flop 402 has a −28 ps PID (a 28 ps delay), and the global skew target is 100 ps. Hence, the expected skew between the flip flop 400 and 402 is 56 ps. As shown in FIG. 4A, the clock arrival time at flip flop 400 is 984 ps and the clock arrival time at flip flop 402 is 997 ps. Hence, the local skew between the flip flops 400 and 402 is 13 ps, which is permissible in light of the global skew target of 100 ps, though much less than the expected skew. In contrast, as shown in FIG. 4B, the clock arrival time at flip flop 400 is 990 ps and the clock arrival time at the flip flop 402 is 1040 ps. Hence, with the example CTS method in which skew windows are dynamically adjusted, the local skew between the flip flops 400 and 402 is 50 ps, which is much closer to the expected skew. Thus, the example CTS method represented by FIG. 4B (with dynamic skew window adjustment) illustrates a timing improvement with better PID honoring when compared to the example CTS method represented by FIG. 4A (with no skew window adjustment).

Figure 5:
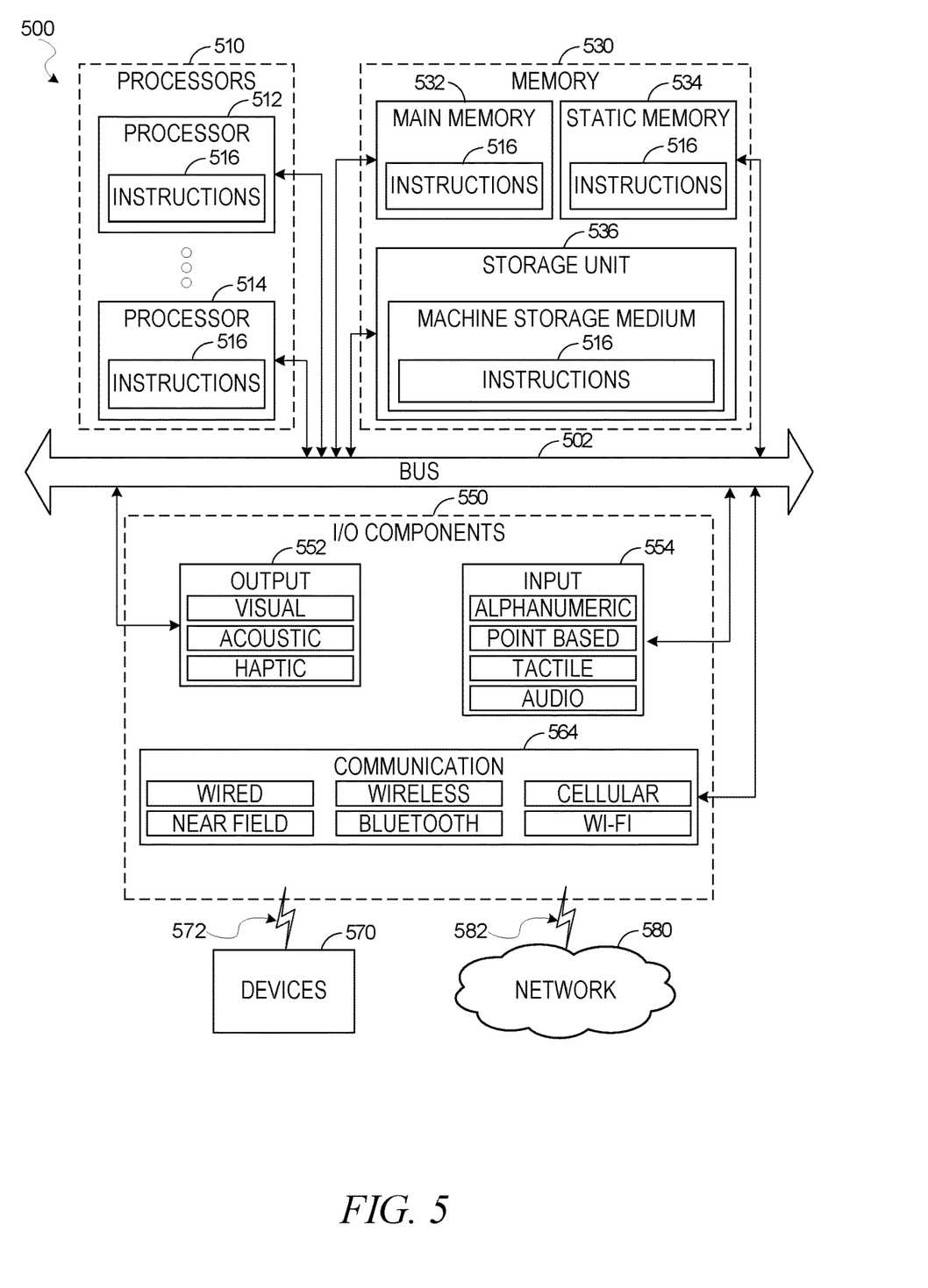
FIG. 5 is a diagrammatic representation of a machine in the example form of a computer system within which a set of instructions for causing the machine to perform any one or more of the methodologies discussed herein may be stored and executed.

FIG. 5 illustrates a diagrammatic representation of a machine 500 in the form of a computer system within which a set of instructions may be executed for causing the machine 500 to perform any one or more of the methodologies discussed herein, according to an example embodiment. Specifically, FIG. 5 shows a diagrammatic representation of the machine 500 in the example form of a computer system, within which instructions 516 (e.g., software, a program, an application, an applet, an app, or other executable code) for causing the machine 500 to perform any one or more of the methodologies discussed herein may be executed. For example, the instructions 516 may cause the machine 500 to execute an EDA software system that executes the method 200. Additionally, or alternatively, the instructions 516 may implement FIGS. 1, 3A, 3B, 4A, and 4B. The instructions 516 transform the general, non-programmed machine 500 into a particular machine 500 programmed to carry out the described and illustrated functions in the manner described here. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 516, sequentially or otherwise, that specify actions to be taken by the machine 500. Further, while only a single machine 500 is illustrated, the term "machine" shall also be taken to include a collection of machines 500 that individually or jointly execute the instructions 516 to perform any one or more of the methodologies discussed herein.

The machine 500 may include processors 510, memory 530, and I/O components 550, which may be configured to communicate with each other such as via a bus 502. In an example embodiment, the processors 510 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 512 and a processor 514 that may execute the instructions 516. The term "processor" is intended to include multi-core processors 510 that may comprise two or more independent processors (sometimes referred to as "cores") that may execute instructions 516 contemporaneously. Although FIG. 5 shows multiple processors 510, the machine 500 may include a single processor 512 with a single core, a single processor 512 with multiple cores (e.g., a multi-core processor 512), multiple processors 510 with a single core, multiple processors 510 with multiple cores, or any combination thereof.

The memory 530 may include a main memory 532, a static memory 534, and a storage unit 536, each accessible to the processors 510 such as via the bus 502. The main memory 532, the static memory 534, and the storage unit 536 store the instructions 516 embodying any one or more of the methodologies or functions described herein. The instructions 516 may also reside, completely or partially, within the main memory 532, within the static memory 534, within the storage unit 536, within at least one of the processors 510 (e.g., within the processor's cache memory), or any suitable combination thereof, during execution thereof by the machine 500.

The I/O components 550 may include a wide variety of components to receive input, provide output, produce output, transmit information, exchange information, capture measurements, and so on. The specific I/O components 550 that are included in a particular machine will depend on the type of machine. For example, portable machines such as mobile phones will likely include a touch input device or other such input mechanisms, while a headless server machine will likely not include such a touch input device. It will be appreciated that the I/O components 550 may include many other components that are not shown in FIG. 5. The I/O components 550 are grouped according to functionality merely for simplifying the following discussion, and the grouping is in no way limiting. In various example embodiments, the I/O components 550 may include output components 552 and input components 554. The output components 552 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components, and so forth. The input components 554 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 550 may include communication components 564 operable to couple the machine 500 to a network 580 or devices 570 via a coupling 582 and a coupling 572, respectively. For example, the communication components 564 may include a network interface component or another suitable device to interface with the network 580. In further examples, the communication components 564 may include wired communication components, wireless communication components, cellular communication components, and other communication components (NFC, Bluetooth, and Wifi) to provide communication via other modalities. The devices 570 may be another machine or any of a wide variety of peripheral devices (e.g., a peripheral device coupled via a universal serial bus (USB)).

Executable Instructions and Machine-Storage Medium

The various memories (e.g., 530, 532, 534, and/or memory of the processor(s) 510) and/or the storage unit 536 may store one or more sets of instructions 516 and data structures (e.g., software) embodying or utilized by any one or more of the methodologies or functions described herein. These instructions 516, when executed by the processor(s) 510, cause various operations to implement the disclosed embodiments.

The terms "machine-storage medium," "device-storage medium," and "computer storage medium" mean the same thing and may be used interchangeably in this disclosure. The terms refer to a single or multiple storage devices and/or media (e.g., a centralized or distributed database, and/or associated caches and servers) that store executable instructions 516 and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "transmission medium" discussed below.

TRANSMISSION MEDIUM

In various example embodiments, one or more portions of the network 580 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 580 or a portion of the network 580 may include a wireless or cellular network, and the coupling 582 may be a Code Division Multiple Access (CDMA) connection, a Global System for Mobile communications (GSM) connection, or another type of cellular or wireless coupling. In this example, the coupling 582 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 516 may be transmitted or received over the network 580 using a transmission medium via a network interface device (e.g., a network interface component included in the communication components 564) and utilizing any one of a number of well-known transfer protocols (e.g., hypertext transfer protocol (HTTP)). Similarly, the instructions 516 may be transmitted or received using a transmission medium via the coupling 572 (e.g., a peer-to-peer coupling) to the devices 570. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 516 for execution by the machine 500, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors 510 that are temporarily configured (e.g., by software) or permanently configured to perform the relevant operations. Similarly, the methods described herein may be at least partially processor-implemented. For example, at least some of the operations of a method may be performed by one or more processors 510. The performance of certain of the operations may be distributed among the one or more processors 510, not only residing within a single machine 500, but deployed across a number of machines 500. In some example embodiments, the processor or processors 510 may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
one or more processors of a machine; and
a computer storage medium storing instructions, which when executed by the machine, cause the machine to perform operations comprising:
   accessing an integrated circuit (IC) design from memory, the IC design comprising a buffer tree and one or more design constraints, the buffer tree comprising a clock buffer, a set of clock sinks, and paths that connect each clock sink in the set of clock sinks to the clock buffer, the one or more design constraints comprising a global skew target;
   identifying a pin insertion delay assigned to a clock sink in a set of clock sinks;
   determining a skew window for a clock sink in the set of clock sinks based on the global skew target, the skew window comprising an advance limit and a delay limit relative to a target delay;
   based on identifying the pin insertion delay assigned to the clock sink, adjusting the skew window for the clock sink based on a skew adjustment parameter, the adjusting of the skew window resulting in an adjusted skew window comprising an adjusted advance limit and an adjusted delay limit relative to the target delay;
   building a clock tree based in part on the buffer tree and the adjusted skew window, the building of the clock tree comprising tuning a clock path delay of the clock sink according to the adjusted skew window; and
   generating a layout instance for the IC design based in part on the clock tree, the layout instance describing physical layout dimensions of the IC device design.

2. The system of claim 1, wherein the adjusting of the skew window comprises adjusting the advance limit and the delay limit, the adjusting of the advance limit and delay limit resulting in the adjusted advance limit and the adjusted delay limit.

3. The system of claim 1, wherein:
the skew adjustment parameter comprises a scaling factor;
the adjusting of the skew window comprises applying the scale factor to the skew window.

4. The system of claim 3, wherein the scaling of the skew window comprises reducing the advance limit and the delay limit of the skew window based on the scaling factor.

5. The system of claim 1, wherein:
the skew adjustment parameter comprises a shifting factor;
the adjusting of the skew window comprises shifting the target delay of the skew window by the shifting factor.

6. The system of claim 1, wherein the tuning of the clock path delay of the clock sink comprises buffering the clock sink in accordance with the adjusted skew window.

7. The system of claim 6, wherein the buffering of the clock sink comprises placing at least one additional clock buffer on a path connecting the clock buffer to the clock sink.

8. The system of claim 1, wherein the determining of the skew window for the clock sink in the set of clock sinks comprises:
determining a skew offset based on the pin insertion delay; and
determining the target delay based on a reference delay and the skew offset.

9. The system of claim 1, wherein:
the clock sink is a first clock sink;
the skew window is a first skew window;
the pin insertion delay is a first pin insertion delay; the adjusted skew window is a first adjusted skew window;
the operations further comprise:
   determining a second skew window for a second clock sink in the set of clock sinks based on the skew target;
   identifying a second pin insertion delay assigned to the second clock sink in the set of clock sinks;
   based on identifying the second pin insertion delay assigned to the second clock sink, adjusting the second skew window for the second clock sink based on the skew adjustment parameter prior to building the clock tree, the adjusting of the second skew window resulting in a second adjusted skew window.

10. A method comprising:
accessing, from memory, an integrated circuit (IC) design comprising a buffer tree and one or more design constraints, the buffer tree comprising a clock buffer, a set of clock sinks, and paths that connect each clock sink in the set of clock sinks to the clock buffer, the one or more design constraints comprising a global skew target;
determining, by one or more hardware processors, a skew window for a clock sink in the set of clock sinks based on the global skew target, the skew window comprising an advance limit and a delay limit relative to a target delay, the clock sink having an assigned pin insertion delay;
based on the clock sink having the assigned pin insertion delay, adjusting, by the one or more hardware processors, the skew window for the clock sink based on a skew adjustment parameter, the adjusting of the skew window resulting in an adjusted skew window comprising an adjusted advance limit and an adjusted delay limit relative to the target delay; and
building, by the one or more hardware processors, a clock tree based in part on the buffer tree and the adjusted skew window, the building of the clock tree comprising tuning a clock path delay of the clock sink according to the adjusted skew window.

11. The method of claim 10, wherein the adjusting of the skew window comprises adjusting the advance limit and the delay limit, the adjusting of the advance limit and delay limit resulting in the adjusted advance limit and the adjusted delay limit.

12. The method of claim 10, wherein:
the skew adjustment parameter comprises a scaling factor;
the adjusting of the skew window comprises applying the scale factor to the skew window.

13. The method of claim 12, wherein the scaling of the skew window comprises reducing the advance limit and the delay limit of the skew window based on the scaling factor.

14. The method of claim 12, wherein:
the skew adjustment parameter comprises a shifting factor;
the adjusting of the skew window comprises shifting the target delay of the skew window by the shifting factor.

15. The method of claim 10, wherein the tuning of the clock path delay of the clock sink comprises buffering the clock sink according to the adjusted skew window.

16. The method of claim 15, wherein the buffering of the clock sink comprises placing at least one additional clock buffer on a path connecting the clock buffer to the clock sink.

17. The method of claim 10, wherein the determining of the skew window for the clock sink in the set of clock sinks comprises:
   determining a skew offset based on the pin insertion delay; and
   determining the target delay based on a reference delay and the skew offset.

18. The method of claim 10, further comprising:
   the clock sink is a first clock sink;
   the skew window is a first skew window;
   the pin insertion day is a first pin insertion delay;
   the adjusted skew window is a first adjusted skew window;
   the operations further comprise:
      determining a second skew window for a second clock sink in the set of clock sinks based on the skew target;
      identifying a second pin insertion delay assigned to the second clock sink in the set of clock sinks;
      based on identifying the second pin insertion delay assigned to the second clock sink, adjusting the second skew window for the second clock sink based on the skew adjustment parameter prior to building the clock tree, the adjusting of the second skew window resulting in a second adjusted skew window.

19. The system of claim 1, further comprising generating a layout instance for the IC design based in part on the clock tree, the layout instance describing physical layout dimensions of the IC device design.

20. A computer storage medium storing instructions which, when executed by a machine, cause the machine to perform operations comprising:
   identifying a pin insertion delay assigned to a clock sink in a set of clock sinks of an integrated circuit (IC) design, the IC design comprising one or more design constraints comprising a global skew target;
   determining a skew window for the clock sink in the set of clock sinks based on the global skew target, the skew window comprising an advance limit and a delay limit relative to a target delay;
   based on identifying the pin insertion delay assigned to the clock sink, adjusting the skew window for the clock sink based on a skew adjustment parameter, the adjusting of the skew window resulting in an adjusted skew window comprising an adjusted advance limit and an adjusted delay limit relative to the target delay;
   building a clock tree based in part on the buffer tree and the adjusted skew window, the building of the clock tree comprising tuning a clock path delay of the clock sink according to the adjusted skew window; and
   generating a layout instance for the IC design based in part on the clock tree, the layout instance describing physical layout dimensions of the IC device design.

* * * * *